US008831680B2

(12) United States Patent
Fa et al.

(10) Patent No.: US 8,831,680 B2
(45) Date of Patent: Sep. 9, 2014

(54) FLEXIBLE AUDIO CONTROL IN MOBILE COMPUTING DEVICE

(75) Inventors: Jinghuai Fa, Plano, TX (US); Justin Manus, San Francisco, CA (US); Karl Townsend, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1377 days.

(21) Appl. No.: 12/012,119

(22) Filed: Jan. 31, 2008

(65) Prior Publication Data

US 2009/0197640 A1 Aug. 6, 2009

(51) Int. Cl.

| | |
|---|---|
| ***H04M 1/00*** | (2006.01) |
| ***H04B 7/00*** | (2006.01) |
| ***H04M 1/60*** | (2006.01) |
| *H04M 1/725* | (2006.01) |

(52) U.S. Cl.

CPC .......... *H04M 1/6066* (2013.01); *H04M 1/7253* (2013.01); *H04M 1/6075* (2013.01)

USPC ...................... 455/556.1; 455/512; 455/569.1

(58) Field of Classification Search

USPC ...................................................... 455/556.1

See application file for complete search history.

(56) References Cited

U.S. PATENT DOCUMENTS

| | | | | |
|---|---|---|---|---|
| 6,397,087 | B1 * | 5/2002 | Kim et al. | 455/569.1 |
| 6,819,946 | B2 * | 11/2004 | Hansson | 455/569.1 |
| 6,999,826 | B1 * | 2/2006 | Zhou et al. | 700/94 |
| 2004/0105558 | A1 * | 6/2004 | Montag et al. | 381/98 |
| 2005/0193081 | A1 * | 9/2005 | Gruber et al. | 709/212 |
| 2006/0046651 | A1 * | 3/2006 | Hazell et al. | 455/41.2 |
| 2006/0206691 | A1 * | 9/2006 | Goodhue et al. | 712/205 |
| 2006/0268743 | A1 * | 11/2006 | Yoshida | 370/254 |
| 2007/0078546 | A1 * | 4/2007 | Hsieh et al. | 700/94 |
| 2007/0238475 | A1 * | 10/2007 | Goedken | 455/512 |
| 2008/0175427 | A1 * | 7/2008 | Chen et al. | 381/387 |
| 2008/0276012 | A1 * | 11/2008 | Mesa et al. | 710/13 |
| 2008/0287063 | A1 * | 11/2008 | Kidron et al. | 455/41.2 |
| 2009/0140043 | A1 * | 6/2009 | Graves et al. | 235/380 |
| 2009/0176452 | A1 * | 7/2009 | Hillyard | 455/41.2 |

OTHER PUBLICATIONS

Wolfson Microelectronics, WM9713L, "AC'97 Audio + Touchpanel CODEC", Preliminary Technical Data, Dec. 2004, Rev 2.4, 111 pages.

* cited by examiner

*Primary Examiner* — Lester Kincaid
*Assistant Examiner* — Andy Gu
(74) *Attorney, Agent, or Firm* — Fulbright & Jaworski LLP

(57) ABSTRACT

A mobile computing device configured to communicate with an audio device comprises an interface circuit, a memory configured to store a plurality of sets of audio parameters for a device type, and a processing circuit. The processing circuit is configured to receive a device identifier, select one of the plurality of audio parameter sets based on the device identifier, generate an audio signal using the selected audio parameters, and transmit the audio signal to the audio device using the interface circuit.

35 Claims, 9 Drawing Sheets

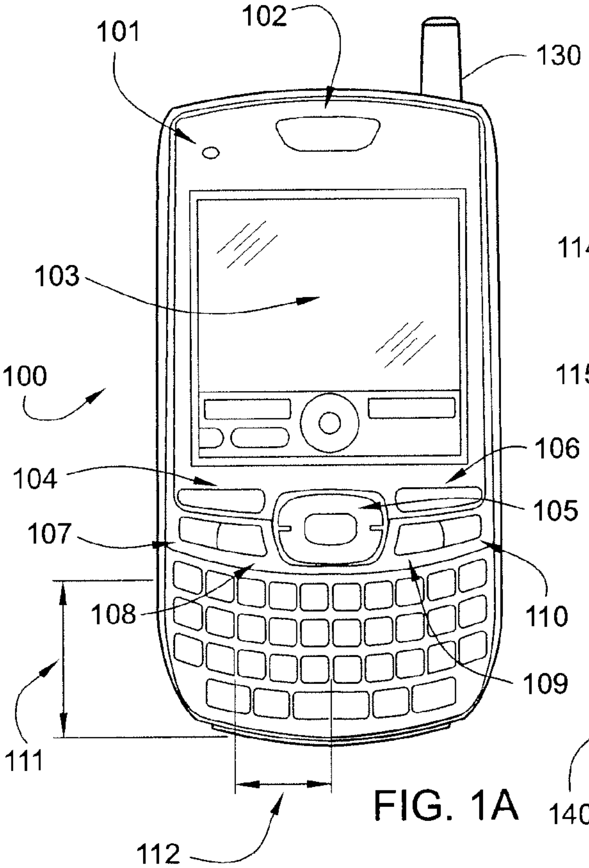
FIG. 1A
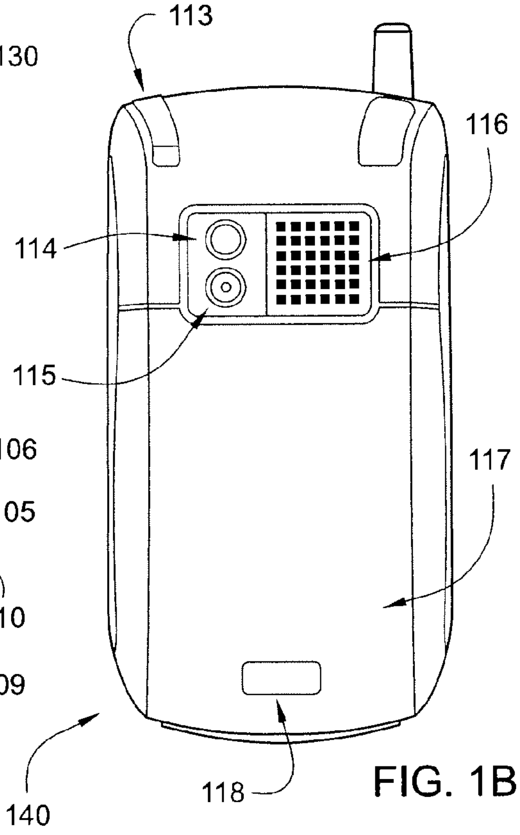
FIG. 1B
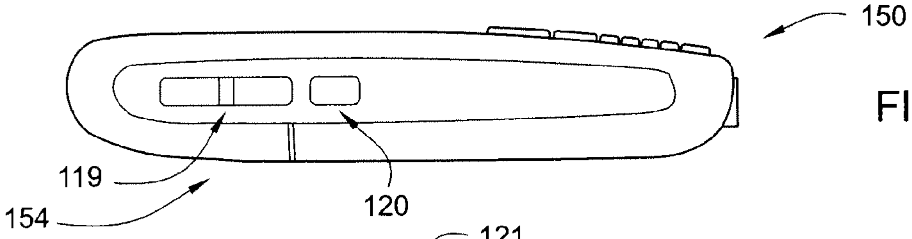
FIG. 1C
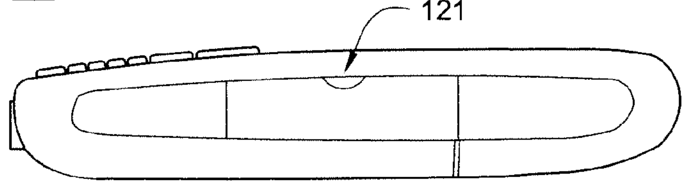
FIG. 1D
FIG. 1E
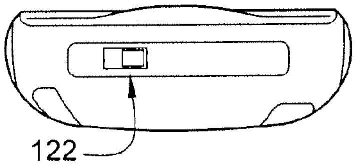
FIG. 1F
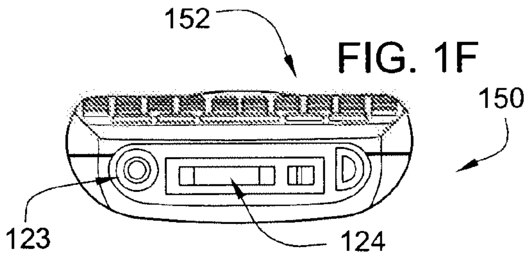

Audio Profile Table
(Audio device numbering system)

| Handset Type 0 | High Bits | Low Bits | Comments |
|---|---|---|---|
| Handset Type 0 | 0x0000 | 0x0000 | Normal handset mode intended for initial release |
| Handset Type 1 | 0x0000 | 0x0001 | Optional handset mode intended for alternate construction such as different second source transducers |
| Handset Type 2 | 0x0000 | 0x0002 | Optional handset mode intended for alternate construction such as different second source transducers |
| USB Headset Type 0 | 0x0001 | 0x0000 | Mono or stereo wired headset |
| USB Headset Type 1 | 0x0001 | 0x0001 | Mono or stereo wired headset |
| USB Headset Type 2 | 0x0001 | 0x0002 | Mono or stereo wired headset |
| USB Headset Type 3 | 0x0001 | 0x0003 | Mono or stereo wired headset |
| USB Headset Type 4 | 0x0001 | 0x0004 | Mono or stereo wired headset |
| USB Headset Type 5 | 0x0001 | 0x0005 | Mono or stereo wired headset |
| USB Headset Type 6 | 0x0001 | 0x0006 | Mono or stereo wired headset |
| USB Headset Type 7 | 0x0001 | 0x0007 | Mono or stereo wired headset |
| BT Headset Type 0 | 0x0002 | 0x0000 | Mono or stereo Bluetooth headset |
| BT Headset Type 1 | 0x0002 | 0x0001 | Mono or stereo Bluetooth headset |
| BT Headset Type 2 | 0x0002 | 0x0002 | Mono or stereo Bluetooth headset |
| BT Headset Type 3 | 0x0002 | 0x0003 | Mono or stereo Bluetooth headset |
| BT Headset Type 4 | 0x0002 | 0x0004 | Mono or stereo Bluetooth headset |
| BT Headset Type 5 | 0x0002 | 0x0005 | Mono or stereo Bluetooth headset |
| BT Headset Type 6 | 0x0002 | 0x0006 | Mono or stereo Bluetooth headset |
| BT Headset Type 7 | 0x0002 | 0x0007 | Mono or stereo Bluetooth headset |
| Handset Speakerphone Type0 | 0x0003 | 0x0000 | Speakerphone mode for the stand-alone handset |
| Handset Speakerphone Type 1 | 0x0003 | 0x0000 | Speakerphone mode for alternate construction |
| Wired Car Kit Type 0 | 0x0004 | 0x0000 | Car kit attached via USB |
| Wired Car Kit Type 1 | 0x0004 | 0x0001 | Car kit attached via USB |
| Wired Car Kit Type 2 | 0x0004 | 0x0002 | Car kit attached via USB |
| Wired Car Kit Type 3 | 0x0004 | 0x0003 | Car kit attached via USB |
| Wired Speakerphone | 0x0005 | 0x0000 | External USB speakerphone |
| BT Car Kit Type 0 | 0x0006 | 0x0000 | Car kit attached via USB |
| BT Car Kit Type 1 | 0x0006 | 0x0000 | Car kit attached via USB |
| BT Speakerphone | 0x0007 | 0x0000 | External Bluetooth speakerphone |
| Generic Stereo Output | 0x0008 | 0x0000 | Stereo signal sent out via generic USB device |
| TTY Mode - Full | 0x000A | 0x0000 | Normal bi-directional TTY mode |
| TTY Mode – VCO | 0x000B | 0x0000 | "Voice Carry Over" for normal hearing far end |
| TTY Mode – HCO | 0x000C | 0x0000 | "Hearing Carry Over" user has normal hearing, but speech impediment |

FIG. 6

FLEXIBLE AUDIO CONTROL IN MOBILE COMPUTING DEVICE

BACKGROUND

The present specification relates generally to the field of mobile computing devices and audio devices related thereto. More specifically, the present specification relates to the field of improving audio quality for an audio device for mobile computing devices.

A multi-processor mobile computing device (e.g., a mobile phone), which may comprise one host processor and one or more wireless radio processors (e.g., modems), can provide higher processing power and related low consumption power than a single-processor mobile computing device. In the case of a mobile phone, the phone-call audio control for different types (or sub-types) of audio devices is a non-trivial task. In this context, the host processor controls communications with the audio devices, and the radio processor(s) provide voice audio paths on different air interfaces, for phone-call voice audio. Each radio processor handles audio tuning parameters in a distributed way in the modem portion, while the host processor handles audio tuning parameters in a centralized way.

Mobile computing devices, such as cellular phones, smartphones, digital music players, etc., usually have designated limited audio device support, with the calibration data built within the firmware of the device.

SUMMARY

According to one exemplary embodiment, a mobile computing device comprises a first processor configured to communicate with an audio device, a second processor configured to communicate audio data over a wireless communication link, and a memory configured to store a plurality of sets of audio parameters. The first processor is configured to establish an audio path between the second processor and the audio device based on a selected one of the plurality of sets of audio parameters.

One embodiment relates to a mobile computing device configured to control an audio path between modem air interfaces and an audio device, through a host processor. The mobile computing device also comprises a memory configured to store a plurality of sets of audio parameters for a device, where each set of audio parameters is associated with a different device identifier. The mobile computing device further comprises a processing circuit configured to receive a device identifier from the audio device, select one of a plurality of audio parameter sets based on the device identifier, generate an audio signal using the audio parameter chosen, and transmit the audio signal to the audio device using the interface circuit of the mobile computing device.

According to another embodiment, the mobile computing device can configure or set up an audio path between a TTY Vocoder on a modem processor and a TTY audio device coupled to a host processor.

Another embodiment relates to a mobile computing device which can set up or configure different tuning parameters for different audio devices. The mobile computing device comprises an interface circuit configured to communicate with the audio device. The mobile computing device also comprises a memory. The mobile computing device further comprises a processing circuit configured to receive a set of audio parameters (e.g., audio tuning parameters) from a remote computer, store the audio parameters in the memory of the mobile computing device, generate an audio signal using the stored audio parameters, and transmit the audio signal to the audio device through the interface circuit of the mobile computing device.

According to another embodiment, the mobile computing device can configure or set up a proper tuning parameter along an audio path between the host processor and modem processor for a specific Bluetooth audio device.

Yet another embodiment relates to a remote server computer. The server computer comprises an interface circuit configured to receive a request, in the form of a device identifier, from a mobile computing device for a set of audio parameters. The server computer also comprises a memory configured to store a plurality of sets of audio parameters for a plurality of audio devices that may be usable with a mobile computing device providing the request. The server computer further comprises a processing circuit configured to receive the request, select one of the plurality of sets of audio parameters based on the provided device identifier, and send the selected set of audio parameters to the interface circuit for transmission to the mobile computing device. The remote connection, between server and mobile computing device, could be either wired or wireless.

According to another embodiment, a mobile computing device may be configured to download a new set of audio parameters for a new audio device from the server using a SMS (Short Messaging Service).

BRIEF DESCRIPTION OF THE DRAWINGS

FIGS. 1A through 1F illustrate a mobile computing device from various views, according to an exemplary embodiment;

FIG. 6 is an example of a mapping table or audio profile numbering system table, according to an exemplary embodiment.

DETAILED DESCRIPTION OF EXEMPLARY EMBODIMENTS

Figure 2:
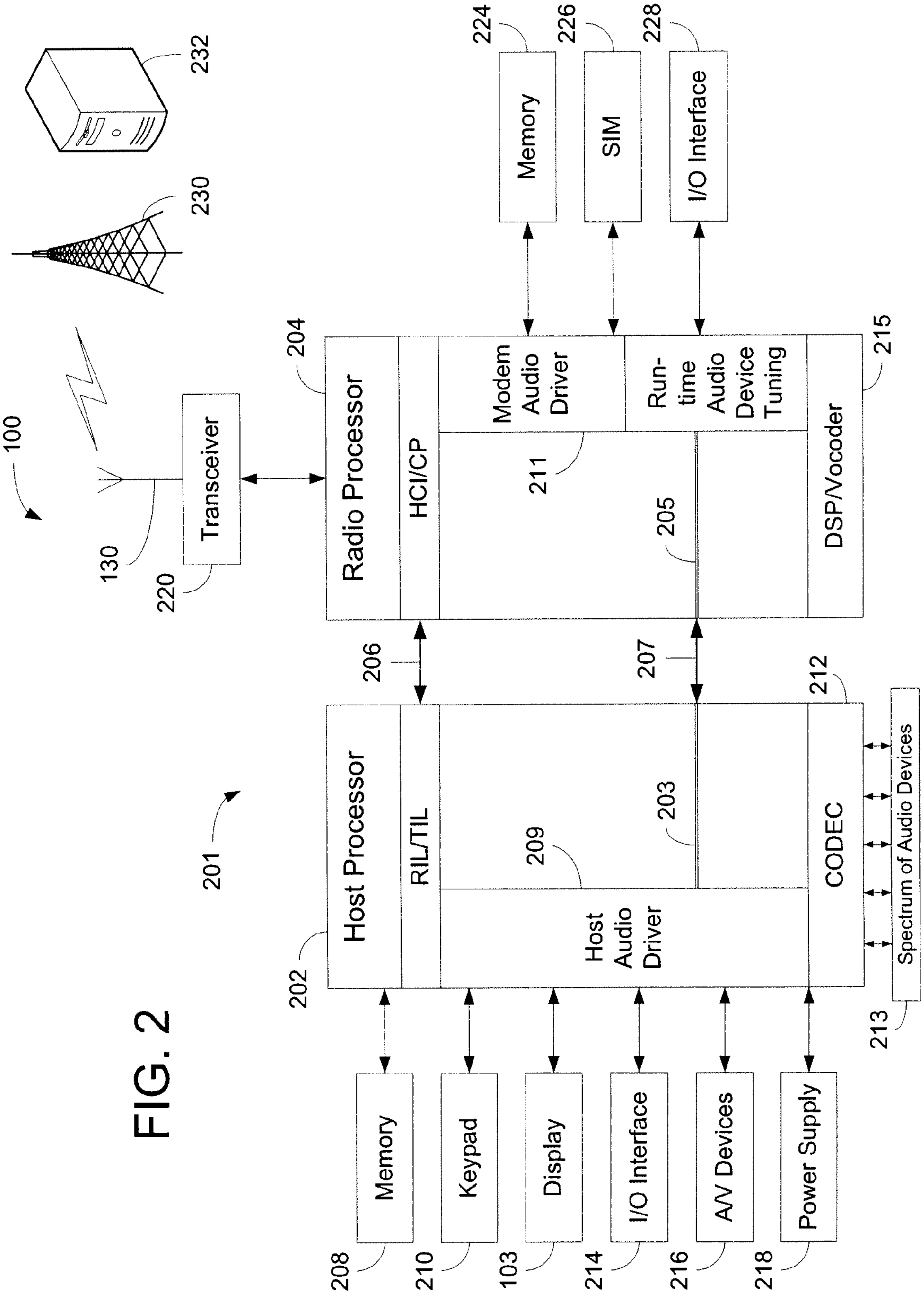
FIG. 2 is a block diagram of the mobile computing device of FIGS. 1A through 1F, according to an exemplary embodiment.

The introduction of a new audio device to a mobile computing device creates challenges in establishing a communication path between the devices. For example, firmware in the mobile computing device may need to be rebuilt to add new audio parameters, which is not desirable after the phone is sold to a customer. Described herein is a system and method for providing a suitable set of audio parameters or calibration data for a specific audio device, which can improve the sound quality of audio to be heard by a user of the audio device. Also described herein is a system and method for providing the ability to change audio parameters or calibration data upon detection of a new audio device, which can improve the quality of the audio. Further described herein is a system and method for allowing a user to tune any new audio device for a phone without rebuilding firmware.

As an example, a mobile phone may be sold before an audio device is introduced commercially. Audio parameters or calibration data for the audio device therefore did not exist when the phone was sold. Described herein is a system and method for determining suitable or improved audio parameters for the new audio device.

Described herein is a system and method for determining a preferred set of audio parameters for an audio device and providing the audio parameters such that the quality of the audio is improved for the audio device. Also described herein is a system and method which updates audio parameters without the need to rebuild the firmware of the phone, allowing new audio devices to be introduced with compatibility to a wider range of phones, with improved audio quality. Also described herein is a system and method wherein new audio parameters may overwrite old audio parameters in order to save memory.

The teachings herein extend to those embodiments which fall within the scope of the appended claims, regardless of whether they accomplish one or more of the above-mentioned exemplary advantages.

Referring to FIGS. 1A through 1F, a mobile computing device 100 is shown from various angles, according to an exemplary embodiment. FIG. 1A is a front view of device 100; FIG. 1B is a rear view of device 100; FIGS. 1C and 1D are side views of device 100; and FIGS. 1E and 1F are top and bottom views of device 100. The device as shown and described in FIGS. 1A through 1F and in subsequent figures is offered as an example of a device that may use flexible audio training for audio devices that couple to the device. The device may be any type of communications or computing device (e.g., a cellular phone, other mobile device, digital media player (e.g., audio or audio/video), personal digital assistant, etc.).

Device 100 may be a smart phone, which is a combination mobile telephone and handheld computer having personal digital assistant ("PDA") functionality. The teachings herein can be applied to other mobile computing devices (e.g., a laptop computer) or other electronic devices (e.g., a desktop personal computer, etc.). PDA functionality can comprise one or more of personal information management, database functions, word processing, spreadsheets, voice memo recording, location-based services, device backup and lock, media playing, internet browsing, etc. and is configured to synchronize personal information (e.g., contacts, e-mail, calendar, notes, to-do list, etc.) from one or more applications with a computer (e.g., desktop, laptop, server, etc.). Device 100 is further configured to receive and operate additional applications provided to device 100 after manufacture, e.g., via wired or wireless download, SecureDigital card, etc.

Device 100 may be a handheld computer (e.g., a computer small enough to be carried in a typical front pocket found in a pair of pants or other similar pocket), comprising such devices as typical mobile telephones and PDAs, but excluding typical laptop computers and tablet personal computers ("PCs"). The various input devices, audio circuits, and other devices of device 100 as described below may be positioned anywhere on device 100 (e.g., the front side of FIG. 1A, the rear side of FIG. 1B, the sides of FIGS. 1C and 1D, etc.).

Device 100 includes various user input devices therein. Examples of functions the user input devices may have include a send button 104 configured to select options appearing on display 103 and/or send messages, a 5-way navigator 105 configured to navigate through options appearing on display 103, a power/end button 106 configured to select options appearing on display 103 and to turn on display 103, a phone button 107 usable to access a phone application screen, a calendar button 108 usable to access a calendar application screen, a messaging button 109 usable to access a messaging application screen (e.g., e-mail, text, MMS, etc.), an applications button 110 usable to access a screen showing available applications, a thumb keyboard 111 (which includes a phone dial pad 112 usable to dial during a phone application), a volume button 119 usable to adjust the volume of audio output of device 100, a customizable button 120 which a user may customize to perform various functions, a ringer switch 122 usable to switch the device from one mode to another mode (such as switching from a normal ringer mode to a meeting ringer mode), and a touch screen display 103 usable to select control options displayed on display 103.

Device 100 also includes various audio circuits. The audio circuits may include phone speaker 102 usable to listen to information in a normal phone mode, external speaker 116 louder than the phone speaker (e.g. for listening to music, for a speakerphone mode, etc.), headset jack 123 to which a user can attach an external headset which may include a speaker and/or a microphone, and microphone 125 which can be used to pick up audio information such as the user's end of a conversation during a phone call.

Device 100 may also include a status indicator 101 that can be used to indicate the status of device 100 (such as messages pending, charging, low battery, etc.), a stylus slot 113 for receiving a stylus such as a stylus usable to input data on touch screen display 103, a digital camera 115 usable to capture images, a mirror 114 positioned proximate camera 115 such that a user may view themselves in mirror 114 when taking a picture of themselves using camera 115, a removable battery 118, and a connector 124 which can be used to connect device 100 to either (or both) an external power supply such as a wall outlet or battery charger or an external device such as a personal computer, a global positioning system ("GPS") unit, a display unit, or some other external device.

Device 100 may also include an expansion slot 121 which may be used to receive a memory card and/or a device which communicates data through slot 121, and a SIM card slot 117, located behind battery 118, configured to receive a SIM card or other card that allows the user to access a cellular network.

In various embodiments device 100 may include a housing 140. Housing 140 may be configured to hold a screen in a fixed relationship above a plurality of user input devices in a substantially parallel or same plane. In the fixed relationship embodiment, this fixed relationship excludes a hinged or movable relationship between the screen and plurality of keys in the fixed embodiment.

Housing 140 could be any size, shape, and dimension. In some embodiments, housing 140 has a width 152 (shorter dimension) of no more than about 200 mm or no more than about 100 mm. According to some of these embodiments, housing 140 has a width 152 of no more than about 85 mm or no more than about 65 mm. According to some embodiments, housing 140 has a width 152 of at least about 30 mm or at least about 50 mm. According to some of these embodiments, housing 140 has a width 152 of at least about 55 mm.

In some embodiments, housing 140 has a length 154 (longer dimension) of no more than about 200 mm or no more than about 150 mm. According to some of these embodiments, housing 140 has a length 154 of no more than about 135 mm or no more than about 125 mm. According to some embodiments, housing 140 has a length 154 of at least about 70 mm or at least about 100 mm. According to some of these embodiments, housing 140 has a length 154 of at least about 110 mm.

In some embodiments, housing 140 has a thickness 150 (smallest dimension) of no more than about 150 mm or no more than about 50 mm. According to some of these embodiments, housing 140 has a thickness 150 of no more than about 30 mm or no more than about 25 mm. According to some embodiments, housing 140 has a thickness 150 of at least about 10 mm or at least about 15 mm. According to some of these embodiments, housing 140 has a thickness 150 of at least about 50 mm.

In some embodiments, housing 140 has a volume of up to about 2500 cubic centimeters and/or up to about 1500 cubic centimeters. In some of these embodiments, housing 140 has a volume of up to about 1000 cubic centimeters and/or up to about 600 cubic centimeters.

Device 100 may include an antenna 130 system for transmitting and/or receiving electrical signals. Each transceiver of device 100 may include individual antennas or may include a common antenna 130. The antenna system may include or be implemented as one or more internal antennas and/or external antennas.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access ("CDMA") cellular radiotelephone communication systems, Global System for Mobile Communications ("GSM") cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service ("GPRS") systems ("GSM/GPRS"), CDMA/1xRTT systems, Enhanced Data Rates for Global Evolution ("EDGE") systems, Evolution Data Only or Evolution Data Optimized ("EV-DO") systems, etc. Device 100 may be configured to provide VoIP (voice over Internet Protocol) communications.

Device 100 may be configured to provide voice and/or data communications functionality through wireless access points ("WAPs") in accordance with different types of wireless network systems (e.g., VoIP, etc.). A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network ("WLAN") system, wireless metropolitan area network ("WMAN") system, wireless wide area network ("WWAN") system (e.g., a cellular network), and so forth. Examples of suitable wireless network systems offering data communication services may include the Institute of Electrical and Electronics Engineers ("IEEE") 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network (PAN) system, such as a Bluetooth® system operating in accordance with the Bluetooth Special Interest Group ("SIG") series of protocols.

As shown in the embodiment of FIG. 2, device 100 may comprise a processing circuit 201 which may comprise a dual processor architecture, including a host processor 202 and a radio processor 204 (e.g., a base band processor or modem). The host processor 202 and the radio processor 204 may be configured to communicate with each other using interfaces 206, 207 such as one or more universal serial bus ("USB") interfaces, micro-USB interfaces, universal asynchronous receiver-transmitter ("UART") interfaces, general purpose input/output ("GPIO") interfaces, control/status lines, control/data lines, shared memory, and so forth.

Device 100 may be configured to provide virtual and/or physical digital audio paths. The digital audio paths may comprise a host physical PCM (pulse-code modulation) audio path 203 and a modem physical audio path 205. Host path 203 and modem path 205 are connected by PCM interface or port 207, which may be a single point of connection between these two processors. Audio driver 209 on host processor 202 routes audio both directions between PCM port 207 and different audio device 213. Modem audio driver 211 routes audio between PCM port 207 and different VOCODERs (voice coder/encoders) 215 in a DSP (digital signal processor) portion of radio processor 204. Alternatively, DSP may be a separate component from radio processor 204. Audio devices 213 may share the same physical PCM audio path, or they may use different physical PCM audio paths, depending on the audio device type. For audio devices that use the same physical PCM audio path, audio driver 209 may be configured to set up or provide virtual PCM audio paths furnished with different audio tuning parameters for each audio device on top of the physical PCM audio path, on both host side 203 and modem side 205.

The host processor 202 may be responsible for executing various software programs such as application programs and system programs to provide computing and processing operations for device 100. The radio processor 204 may be responsible for performing various voice and data communications operations for device 100 such as transmitting and receiving voice and data information over one or more wireless communications channels. Although embodiments of the dual processor architecture may be described as comprising the host processor 202 and the radio processor 204 for purposes of illustration, the host processor 202 and radio processor 204 (dual processor) arrangement of device 100 may comprise one processor, more than two processors, may be implemented as a dual- or multi-core chip with both host processor 202 and radio processor 204 on a single chip, etc. Alternatively, processing circuit 201 may comprise any digital and/or analog circuit elements, comprising discrete and/or solid state components, suitable for use with the embodiments disclosed herein.

In various embodiments, the host processor 202 may be implemented as a host central processing unit ("CPU") using any suitable processor or logic device, such as a general purpose processor. The host processor 202 may comprise, or be implemented as, a chip multiprocessor ("CMP"), dedicated processor, embedded processor, media processor, input/output ("I/O") processor, co-processor, field programmable gate array ("FPGA"), programmable logic device ("PLD"), or other processing device in alternative embodiments.

The host processor 202 may be configured to provide processing or computing resources to device 100. For example, the host processor 202 may be responsible for executing various software programs such as application programs and system programs to provide computing and processing operations for device 100. Examples of application programs may include, for example, a telephone application, voicemail application, e-mail application, instant message ("IM") application, short message service ("SMS") application, multimedia message service ("MMS") application, web browser application, personal information manager ("PIM") application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface ("GUI") to communicate information between device 100 and a user.

System programs assist in the running of a computer system. System programs may be directly responsible for controlling, integrating, and managing the individual hardware components of the computer system. Examples of system programs may include, for example, an operating system ("OS"), device drivers, programming tools, utility programs, software libraries, an application programming interface ("API"), a GUI, and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless ("BREW") OS, JavaOS, a Wireless Application Protocol ("WAP") OS, and so forth.

Device 100 may comprise a memory 208 coupled to the host processor 202. In various embodiments, the memory 208 may be configured to store one or more software programs to be executed by the host processor 202. The memory 208 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory ("RAM"), dynamic RAM ("DRAM"), Double-Data-Rate DRAM ("DDRAM"), synchronous DRAM ("SDRAM)", static RAM ("SRAM"), read-only memory ("ROM"), programmable ROM ("PROM"), erasable programmable ROM ("EPROM"), electrically erasable programmable ROM ("EEPROM"), flash memory (e.g., NOR or NAND flash memory), or any other type of media suitable for storing information.

Although the memory 208 may be shown as being separate from the host processor 202 for purposes of illustration, in various embodiments some portion or the entire memory 208 may be included on the same integrated circuit as the host processor 202. Alternatively, some portion or the entire memory 208 may be disposed on an integrated circuit or other medium (e.g., hard disk drive) external to the integrated circuit of host processor 202. In various embodiments, device 100 may comprise a memory port or expansion slot 121 (shown in FIG. 1) to support a multimedia and/or memory card, for example. Processing circuit 201 may use memory port or expansion slot 121 to read and/or write to a removable memory card having memory, for example, to determine whether a memory card is present in port or slot 121, to determine an amount of available memory on the memory card, to store subscribed content or other data or files on the memory card, etc.

Device 100 may comprise a user input device 210 coupled to the host processor 202. The user input device 210 may comprise, for example, a alphanumeric, numeric or QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad and so forth. Examples of such objects are shown in FIG. 1 as 5-way navigator 105, power/end button 106, phone button 107, calendar button 108, messaging button 109, applications button 110, thumb keyboard 111, volume button 119, customizable button 120, and ringer switch 122.

The host processor 202 may be coupled to a display 103. The display 103 may comprise any suitable visual interface for displaying content to a user of device 100. For example, the display 103 may be implemented by a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program.

Device 100 may comprise an I/O interface 214 coupled to the host processor 202. The I/O interface 214 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a PC. In various implementations, device 100 may be configured to transfer and/or synchronize information with the local computer system.

The host processor 202 may be coupled to various audio/video ("A/V") devices 216 that support A/V capability of device 100. Examples of A/V devices 216 may include, for example, a microphone, one or more speakers, an audio port to connect an audio headset, an audio coder/decoder (codec), an audio player, a digital camera, a video camera, a video codec, a video player, and so forth.

The host processor 202 may be coupled to a power supply 218 configured to supply and manage power to the elements of device 100. In various embodiments, the power supply 218 may be implemented by a rechargeable battery, such as a removable and rechargeable lithium ion battery to provide direct current ("DC") power, and/or an alternating current ("AC") adapter to draw power from a standard AC main power supply.

As mentioned above, the radio processor 204 may perform voice and/or data communication operations for device 100. For example, the radio processor 204 may be configured to communicate voice information and/or data information over one or more assigned frequency bands of a wireless communication channel. In various embodiments, the radio processor 204 may be implemented as a communications processor using any suitable processor or logic device, such as a modem processor or baseband processor. Although some embodiments may be described with the radio processor 204 implemented as a modem processor or baseband processor by way of example, it may be appreciated that the embodiments are not limited in this context. For example, the radio processor 204 may comprise, or be implemented as, a digital signal processor ("DSP"), media access control ("MAC") processor, or any other type of communications processor in accordance with the described embodiments. Radio processor 204 may be any of a plurality of modems manufactured by Qualcomm, Inc. or other manufacturers.

Device 100 may comprise a transceiver 220 coupled to the radio processor 204. The transceiver 220 may comprise one or more transceivers configured to communicate using different types of protocols, communication ranges, operating power requirements, RF sub-bands, information types (e.g., voice or data), use scenarios, applications, and so forth. For example, transceiver 220 may comprise a Wi-Fi transceiver and a cellular or WAN transceiver configured to operate simultaneously. Further, transceiver 220 may be configured to communicate using a VoIP protocol.

The transceiver 220 may be implemented using one or more chips as desired for a given implementation. Although the transceiver 220 may be shown as being separate from and external to the radio processor 204 for purposes of illustration, in various embodiments some portion or the entire transceiver 220 may be included on the same integrated circuit as the radio processor 204.

Device 100 may comprise an antenna system 130 for transmitting and/or receiving electrical signals. As shown, the antenna system 130 may be coupled to the radio processor 204 through the transceiver 220. The antenna system 130 may comprise or be implemented as one or more internal antennas and/or external antennas. Radio tower 230 and server 232 are shown as examples of potential objects configured to receive a signal from antenna system 130.

Device 100 may comprise a memory 224 coupled to the radio processor 204. The memory 224 may be implemented using one or more types of machine-readable or computer-readable media capable of storing data such as volatile memory or non-volatile memory, removable or non-removable memory, erasable or non-erasable memory, writeable or re-writeable memory, etc. The memory 224 may comprise, for example, flash memory and secure digital ("SD") RAM. Although the memory 224 may be shown as being separate from and external to the radio processor 204 for purposes of illustration, in various embodiments some portion or the entire memory 224 may be included on the same integrated circuit as the radio processor 204. Further, host processor 202 and radio processor 204 may share a single memory.

Device 100 may comprise a subscriber identity module ("SIM") 226 coupled to the radio processor 204. SIM 226 may comprise, for example, a removable or non-removable smart card configured to encrypt voice and data transmissions and to store user-specific data for allowing a voice or data communications network to identify and authenticate the user. SIM 126 also may store data such as personal settings specific to the user.

Device 100 may comprise an I/O interface 228 coupled to the radio processor 204. The I/O interface 228 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, GPS techniques, Cell Global Identity ("CGI") techniques, CGI including timing advance ("TA") techniques, Enhanced Forward Link Trilateration ("EFLT") techniques, Time Difference of Arrival ("TDOA") techniques, Angle of Arrival ("AOA") techniques, Advanced Forward Link Trilateration ("AFTL") techniques, Observed Time Difference of Arrival ("OTDOA"), Enhanced Observed Time Difference ("EOTD") techniques, Assisted GPS ("AGPS") techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

In various embodiments, device 100 may comprise dedicated hardware circuits or structures, or a combination of dedicated hardware and associated software, to support position determination. For example, the transceiver 220 and the antenna system 130 may comprise GPS receiver or transceiver hardware and one or more associated antennas coupled to the radio processor 204 to support position determination.

The host processor 202 may comprise and/or implement at least one location-based service ("LBS") application. In general, the LBS application may comprise any type of client application executed by the host processor 202, such as a GPS application configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest ("POI") such as restaurants, hotels, landmarks, and entertainment venues, and other types of LBS services in accordance with the described embodiments.

Radio processor 204 may be configured to invoke a position fix by configuring a position engine and requesting a position fix. For example, a position engine interface on radio processor 204 may set configuration parameters that control the position determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service ("QoS") values, optimization parameters (e.g., optimized for speed, accuracy, or payload), PDE address (e.g., IP address and port number of LPS or MPC), etc. In one embodiment, the position engine may be implemented as a QUALCOMM® gpsOne® engine.

Figure 3A:
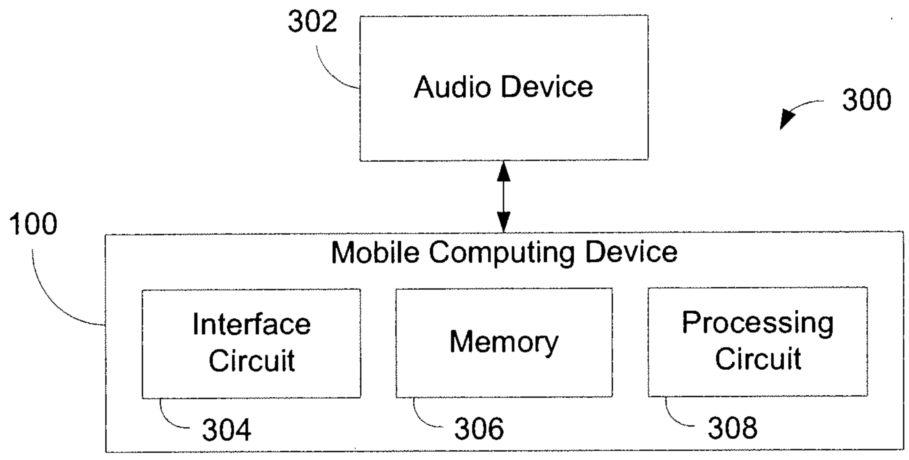
FIG. 3A is a block diagram of the mobile computing device of FIG. 2 configured to communicate with an audio device, according to an exemplary embodiment.

Referring to FIG. 3A, a block diagram 300 of mobile computing device 100 in communication with an audio device 302 is shown, according to an exemplary embodiment. Audio device 302 may comprise zero, one or a plurality of microphones or other audio sense elements and zero, one or a plurality of speakers, in various embodiments. Audio device 302 may be configured to accept an input from device 100 and provide an output to a user of audio device 302. For example, audio device 302 may be a headset, a handset, Bluetooth headset or earphone, a USB headset, a text telephone ("TTY") device, a wired car kit, Bluetooth car kit, a wired speakerphone, etc., any of which may comprise a microphone and one or more speakers, or any other device used to communicate information provided by device 100.

Audio device 302 is shown as being coupled to mobile computing device 100. According to many exemplary embodiments, audio device 302 may either be a part of device 100 or be a separate device. Audio device 302 may have a separate housing coupleable to device 100, either via a wired or wireless interface. Audio device 302 and device 100 may have a different power source (e.g., battery powered) and may be charged independently, may share a power source and be charged concurrently when coupled, or may share a power source and be charged concurrently continuously. There may be one or multiple audio devices 302 in communication with device 100 at any given time.

Mobile computing device 100 is shown with interface circuit 304, memory 306, and processing circuit 308. Mobile computing device 100 may have one or more of the functionalities as described in FIGS. 1 and 2 in addition to the functionality of interface circuit 304, memory 306, and processing circuit 308. Interface circuit 304 may comprise any electrical and/or mechanical components configured to accept an input signal from audio device 302, either via a wired or wireless connection. Memory 306 may have the functionality as described in FIG. 2 in addition to storing a plurality of sets of audio parameters for various accessories 302. Each audio device 302 may have a set of audio parameters or calibration data associated with itself and the data may be stored in memory 208 for future use.

Processing circuit 308 may receive a device identifier from audio device 302 via interface circuit 304. Processing circuit 308 may be responsible for selecting one of a plurality of audio parameters or calibration data based upon the device identifier. Processing circuit 308 may select the audio parameter or calibration data from memory 306. Processing circuit 308 may comprise a host processor, radio processor, any other processor, or any other electrical or electromechanical components, analog and/or digital, (e.g., microcontrollers, microprocessors, application-specific integrated circuits (ASICs), field programmable gate arrays, etc.) required to perform the functions described herein.

Memory 306 may be any type of memory described herein and may be configured to store all audio parameter sets that are used by mobile computing device 100 (non-volatile memory), may store an audio parameter set for only as long as the associated audio device is in use (volatile memory), or may store a specific number of recently used audio parameter sets, deleting older audio parameter sets that were not used recently either without user input or in response to a user request or confirmation to delete audio parameter sets.

Figure 3B:
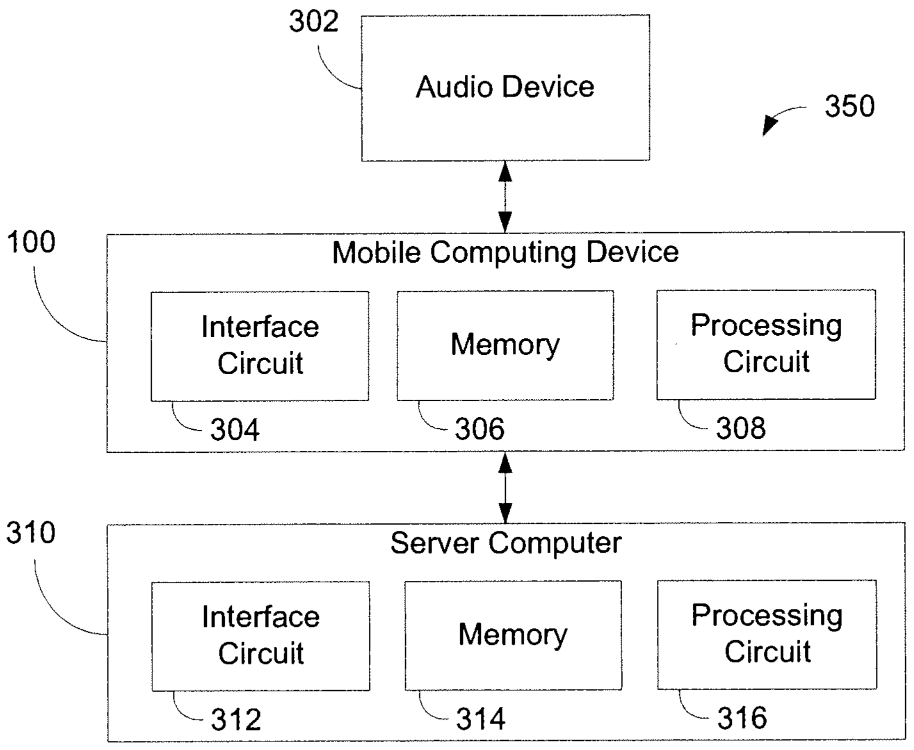
FIG. 3B is a block diagram of the mobile computing device of FIG. 2 also in communication with a server computer, according to an exemplary embodiment.

Referring to FIG. 3B, a block diagram 350 of a mobile computing device 100 in communication with both audio device 302 and a server computer 310 is shown, according to another exemplary embodiment. Processing circuit 308 may receive a device identifier from audio device 302 via interface circuit 304. Processing circuit 308 may be responsible for selecting one of a plurality of audio parameters or calibration data based upon the device identifier. Processing circuit 308 may select the audio parameter or calibration data from memory 306 if such data exists in memory 306. Otherwise, processing circuit may choose to connect, either via a wireless or wired connection, to server computer 310. According to an alternative exemplary embodiment, processing circuit 308 may choose to always send a request to server computer 310 in lieu of using memory 306 to search for the desired audio parameter. Processing circuit 308 may send the device identifier provided by audio device 302 or may produce an alternative identifier to transmit to server computer 310 (e.g., an audio profile as described in FIG. 4).

Server computer 310 may use interface circuit 312 to receive a request from mobile computing device 100. Interface circuit 312 may be configured to communicate with device 100 in various ways, either via a wired or wireless connection (e.g., a cellular network for communications). The request may relate to finding a single desired audio parameter for audio device 302, and may come in the form of a device identifier provided by audio device 302. Server computer 310 also contains memory 314, which may store a plurality of audio parameter sets for various audio devices. Memory 314 may contain multiple audio parameter sets for a single type of audio device (e.g., Bluetooth headsets, handsets, TTY devices, etc.).

Server computer 310 also contains processing circuit 316 which receives a device identifier from interface circuit 312. Processing circuit 316 may be configured to select one of a plurality of audio parameters or calibration data based upon the device identifier. Processing circuit 316 may select the audio parameter or calibration data from memory 314. The audio parameter is then provided from server computer 310 to mobile computing device 100 via interface circuit 312 (e.g., and any other communication medium between interface circuit 312 and device 100).

Memory 306 of the mobile computing device as shown in FIGS. 3A and 3B may have data either received from server computer 310 or may have data preloaded. For example, existing audio parameter sets may be preloaded onto memory 306 before mobile computing device 100 is sold to a user by the manufacturer of mobile computing device 100. Deletion of a set of audio parameters may also occur in memory 306. For example, if a set of audio parameters are infrequently used, or a new set of audio parameters designed to replace the original audio parameters are introduced, a deletion of an audio parameter set from memory 306 may occur.

Figure 4A:
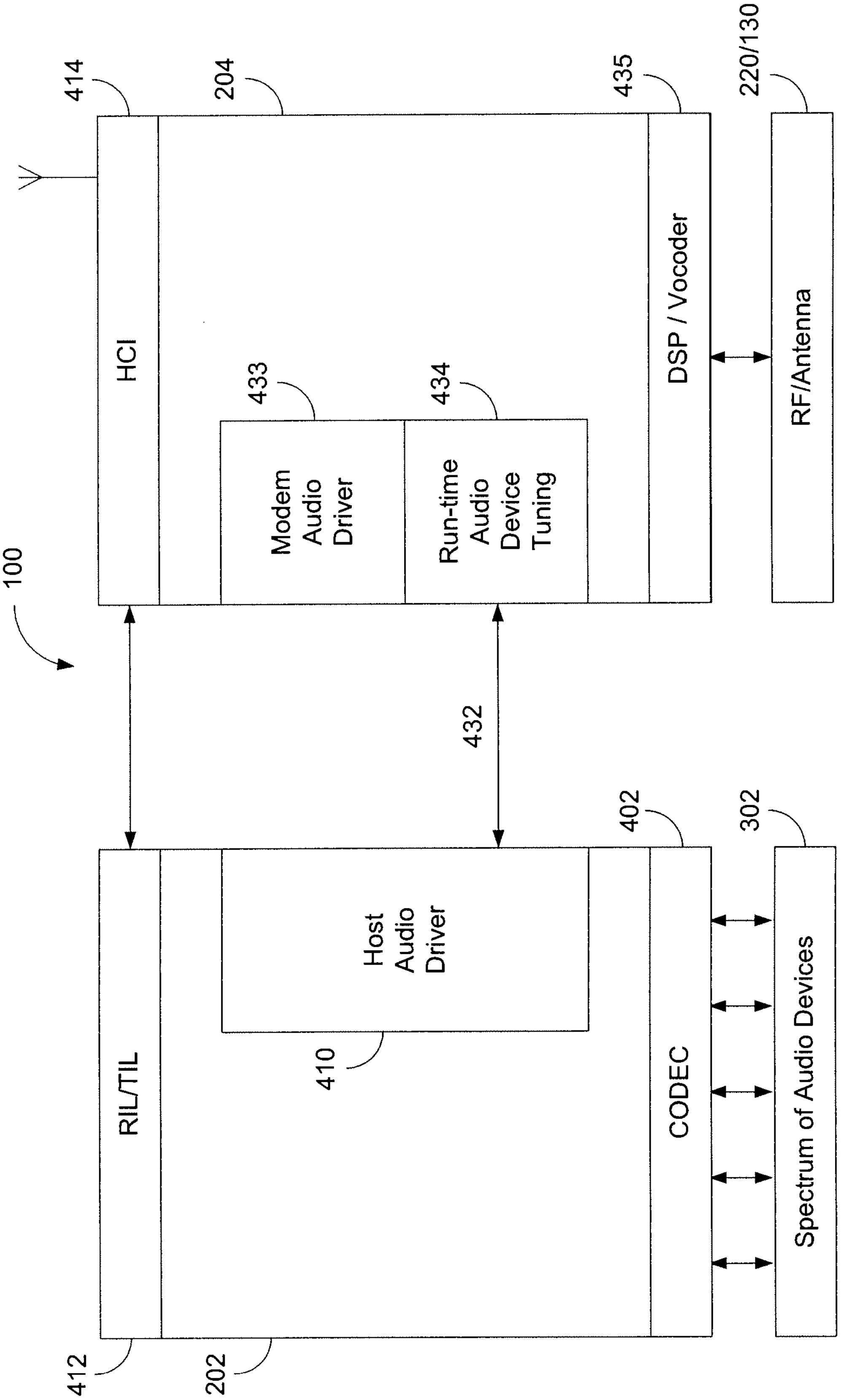
FIG. 4A is a block diagram of the mobile computing device of FIG. 2 interacting with a plurality of audio devices and illustrating a modem, according to an exemplary embodiment.

Referring to FIG. 4A, a block diagram of mobile computing device 100 is shown in more detail, according to an exemplary embodiment in which a dual processor arrangement is used. Audio device 302 is shown coupled to device 100. There may be one or more audio devices 302 coupled to device 100 at any time. Codec 402 (e.g., an encoder, a decoder, an encoder-decoder, compressor-decompressor, etc.) may be implemented either within device 100 or may be coupled to device 100 in various manners. Codec 402 may be part of or the entirety of the interface circuit 304 of FIGS. 3A and 3B or may simply be coupled to the interface circuit 304 of FIGS. 3A and 3B. Codec 402 is responsible for accepting an input from audio device 302 and decoding the input for use by mobile computing device 100. Codec 402 may additionally be responsible for encoding an output for audio device 302. Alternatively, the encoding and decoding of the signal or input provided by audio device 302 may be performed elsewhere within device 100. Codec 402 may be a combined digital to analog ("D/A") and analog to digital ("A/D") converter, where the digital signal may be pulse code modulated ("PCM").

Host processor 202 and radio processor (or modem processor) 204 are shown as parts of mobile computing device 100. The two processors may have the functionality as described for the various processors in FIG. 2 and/or FIGS. 3A and 3B, may provide different functionality, or may provide some of the functionality as described below. Host processor 202 may also be known as an "applications" processor.

Host processor 202 contains host audio driver 410. Host audio driver 410 may be configured to receive a decoded signal from codec 402 and may determine the audio device type. Host audio driver 410 may provide a set of audio parameters (e.g., an audio profile) to radio processor 204 through radio interface layer ("RIL") or telephony interface layer ("TIL") 412. Host audio driver 410 also sets the audio mode of host processor 202 for PCM audio being routed to and from the target audio device 302.

A PCM audio bus 432 may be provided to transmit PCM audio between processors 202 and 204. The PCM audio port may be a 4-pin interface configured to allow two-way audio transmissions. PCM audio bus 432 may be used to facilitate run-time communications between the processors and may be used to change the audio parameters being used by mobile computing device 100 at any given time. Bus 432 may operate according to a universal serial bus (USB) protocol and structure (e.g., isochronous audio) or other bus protocols and structures.

The digital audio path from audio device 302 through device 100 and to the antenna may proceed as follows. Audio data received from the audio device is received through codec 402 by host audio driver 410. Control messages relating to the audio data are sent via RIL/TIL (radio interface layer/telephony interface layer) 412 to HCI (host control interface) 414. The audio data itself is sent via PCM audio bus 432 to the modem audio driver 433 and the modem DSP 435 to transceiver/antenna 220/130. Telephony audio data follows a return path in the reverse direction through this audio path.

Figure 7:
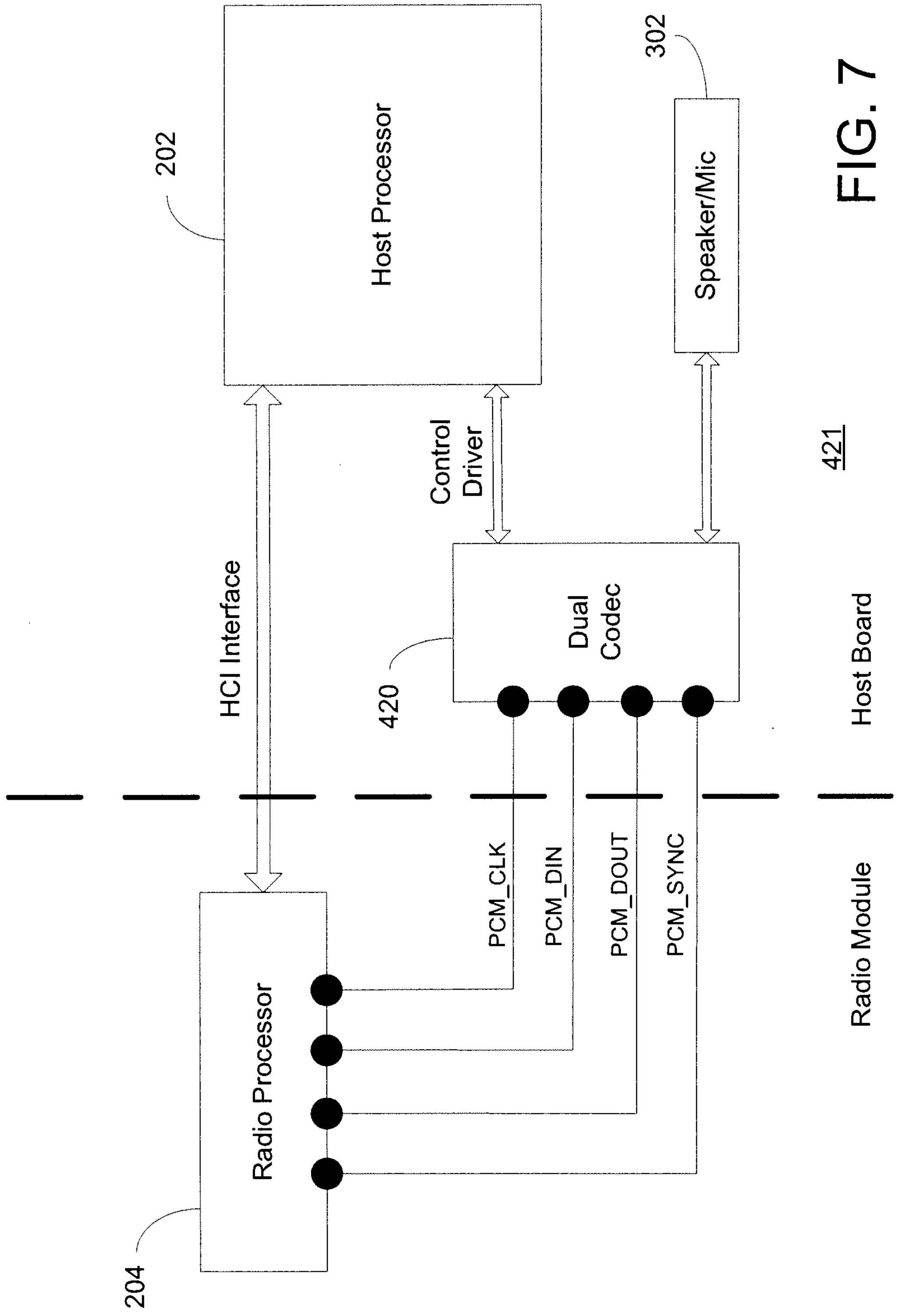
FIG. 7 is a block diagram illustrating a computing device, according to another exemplary embodiment.

Another alternative embodiment is shown in exemplary form in FIG. 7, in which codec 420 may be a separate unit coupled to a host board (e.g., printed circuit board) 421. In this embodiment, radio processor 204 is configured to provide clock, synchronization, and data in/out signals in pulse-code modulation format to codec 420. In the case of a voice call, audio signals and data from audio device 302 may be sent through codec 420 and the PCM_DOUT bus to radio processor 204, with return audio signals traveling from radio processor 204 through the PCM_DIN bus to codec 420 to the speaker portion of audio device 302. The PCM_SYNC clock is enabled automatically during the telephone call. In this embodiment, the audio data may be calibrated at radio processor 204, codec 402, or both using a selected set of audio parameters.

Radio processor 204 may perform one or more of the following functions in the various embodiments. Radio processor 204 may be configured to process the TIL message (e.g., as an HCI task). The TIL message may comprise the selected set of audio parameters from host processor 202. The TIL message may comprise a message to set a mode of the modem to a mode commanded by host processor 202 (e.g., sleep mode, awake mode, telephony mode, dormant mode, etc). Radio processor 204 may also be configured to set the modem audio path between a port coupled to PCM audio bus 432 and DSP/vocoder (voice codec) 435. Radio processor 204 may also be configured to set the corresponding vocoder. Radio processor 204 may also be configured to set a corresponding DSP mode for audio Digital Signal Processing. Radio processor 204 may also be configured to set tuning parameters (e.g., the audio parameters or calibration data for the audio signal).

Host processor 202 may perform one or more of the following functions in the various embodiments. Host processor 202 may be configured to detect the type of audio device 302. Host processor 202 may be configured to select the set of audio parameters and transfer the audio parameters to radio processor 204 through TIL, wherein the set of audio parameters comprises an audio class type and a subclass, as will be described below with reference to FIG. 4B. Host processor 202 may be configured to set the audio mode of radio processor 204 using host audio driver 410, for example, for PCM audio data being routed to or from audio device 302.

Figure 4B:
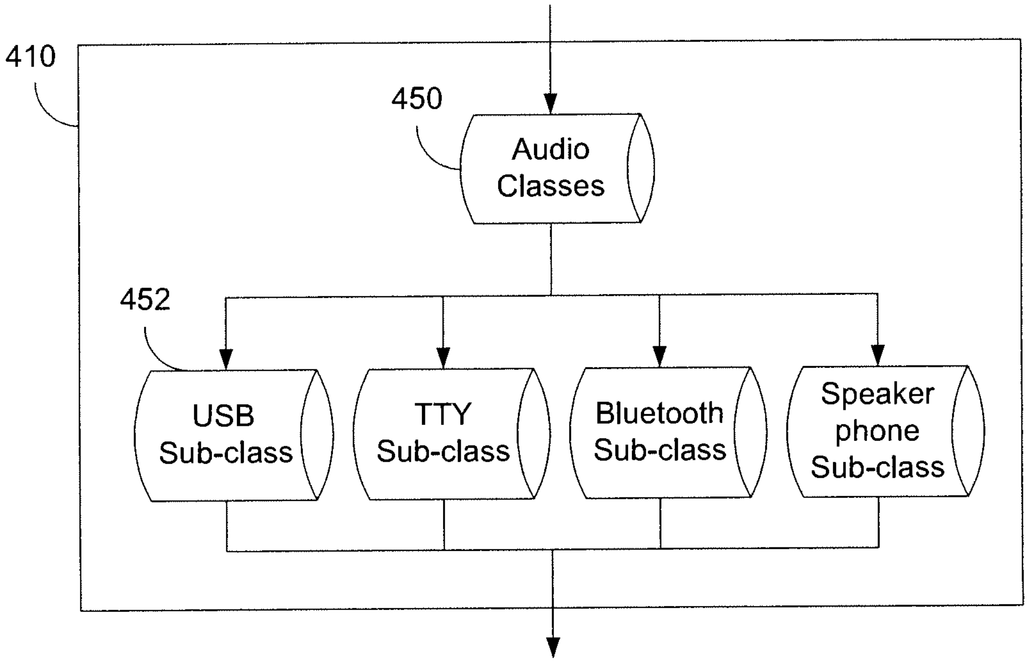
FIGS. 4B and 4C are block diagrams of a method of determining a set of audio parameters of an audio device, according to an exemplary embodiment.
Figure 4C:
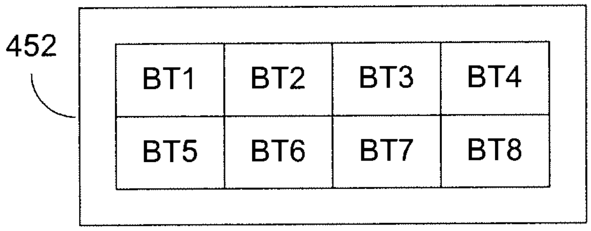

Referring to FIG. 4B, a block diagram of the process of selecting an audio profile or set of audio parameters via host audio driver 410 is shown, according to an exemplary embodiment. A set of audio parameters may be greater or less than about 128 Bytes and greater or less than about 512 Bytes. According to an alternative embodiment, a process operable on radio processor 204 may be configured to select the proper audio parameter set. Thus, either host processor 202 or radio processor 204 may be configured to select or generate the audio parameter set from internal memory or via communications with an outside source, such as a remote server, as will be described below with reference to FIG. 5C.

A device identifier received from audio device 302 is compared to an audio classes database 450 or other storage device. Audio classes database 450 may contain data regarding various types of audio devices (e.g., a handset, a headset, a Bluetooth device, a speakerphone device, a USB device, a TTY device, a car kit device, etc.). Audio classes database 450 may select an audio class that most closely resembles the audio device based on the provided device identifier.

Each audio class in audio classes database 450 may have its own sub-class or subset database 452. Also referring to FIG. 4B, sub-class database 452 is shown in greater detail. For example, a sub-class database 452 for a Bluetooth device (e.g., a Bluetooth headset) may contain multiple sub-classes (e.g., labeled BT1, BT2, etc., which may represent different manufacturers, different model numbers, etc). Each sub-type in sub-class database 452 may represent different settings for the same type of device. For example, two headsets manufactured by two different companies may have different audio parameter requirements and therefore must be differentiated. The audio class provided by audio classes database 450 and the sub-class provided by sub-class database 452 may be combined to form a set of audio parameters that host audio driver 410 may provide for the modem processor.

In one exemplary embodiment, the sets of audio parameters in the subclasses are prestored during manufacture and may remain static. The sets of audio parameters may be stored in memory 208, memory 224, in either of processors 202 or 204 or any portion thereof, etc. One set of audio parameters may be selected as a default set of audio parameters to apply to audio data being sent from device 100 to a default audio device. In this example, host processor 202 is configured to store a pointer which points to the default or selected set of audio parameters. The pointer may change to point to a different set of audio parameters in response to a change in the audio device, since the audio device in use may change from time to time. A mapping table may be stored in memory to associate a pointer location with a device class or type and/or with a device subclass or specific audio device identifier. According to another exemplary embodiment, audio device 302 (e.g., audio peripheral, headset, etc.) may be configured to transmit a set of audio parameters associated with the audio device to device 100 (e.g., to the host processor). Device 100 may be configured to receive the set of audio parameters and store them for use as described herein.

Referring to FIG. 6, an exemplary mapping table is shown. The mapping table may be an audio device registration numbering system in 64 bits, where the first 32 bits represents an audio device class, and the next 32 bits represents an audio device sub-class within the same class. This numbering system constructs a mapping between audio device and audio parameter set (or profile) for all audio devices known to device 100, as well as certain profile slots for new audio devices. The mapping table provides a common protocol between host processor 202 and modem processor or processors 204. The mapping table may be pre-defined for a plurality of known audio devices. The mapping table may be hard coded in firmware or may be configurable in flash memory or other configurable memory. The mapping table maps the set of audio parameters (e.g., profile) with the pointer address. Each pointer address may have at least one high set of bits (e.g., a byte, 16-bit word, or 32 bit word) and at least one low set of bits (e.g., a byte, 16-bit word, or 32 bit word). One bit or any plurality of bits may be used for pointer addresses in alternative embodiments. In this exemplary embodiment, a high set of bits is used to identify a device type or class (e.g. handset, USB headset, BT headset, handset speakerphone, wired car kit, wired speakerphone, BT car kit, BT speakerphone, generic stereo output, TTY Mode—Full, TTY Mode—VCO, or TTY Mode—HCO) and a low set of bits is used to identify a device sub-class or particular audio device.

According to one exemplary embodiment, changing the pointer may be automatic. Automatic configuration for a new audio device may comprise receiving a device identifier and changing the pointer to select an audio parameter set based on the device identifier, without manual input from a user of the mobile computing device. Automatic configuration may alternatively further comprise detecting a signal from the audio device without manual input from a user of the mobile computing device before receiving the device identifier and selecting the audio parameter set.

In any case, the audio parameter set is selected and may be sent from host processor 202 to modem processor 204 on interface or port 206 (FIG. 2). Modem processor 204 may then be configured to apply the audio parameter set to audio signals passing along an audio path in one or both directions between host processor 202 and transceiver 220. Alternatively, the device identifier, pointer address, or other indicator of audio parameter set may be sent from host processor 202 to modem processor 204 on interface or port 206, and modem processor 204 may be configured to load the corresponding audio parameter set from any memory. One or more of the sets of audio parameters may be prestored on the host processor, radio processor, or both. If stored on one of host processor and radio processor, a set of audio parameters selected based on an audio device identifier may be transmitted to the other of the host processor and radio processor after the audio device is detected by the host processor. In one exemplary embodiment, the host processor is configured to store one or more of the gain parameters from an audio parameter set and the host processor is configured to store others of the gain parameters and all echo cancellation parameters.

The database of audio parameters may comprise a predetermined number of empty locations or slots which may store new sets of audio parameters for known or unknown new audio devices to be used. For example, unknown audio devices may come to be known after a software release for device 100.

The audio parameters (e.g., tuning parameters) may be determined before manufacturing in a laboratory setting. After laboratory testing for a new audio device, a new audio profile may be assigned and a new set of audio parameters may be downloaded from a memory card, synchronization operation or downloading (e.g., via a universal serial bus or other wired connection) with a personal computer, or over the air, as will be described in greater detail below. Those downloads may be stored in a NV (non-volatile) memory location.

Referring back to FIG. 4A, once selected, the set of audio parameters is sent using RIL/TIL 412 to radio processor 204. HCI 414 receives the set of audio parameters from RIL/TIL 412 and may process the set of audio parameters for use by radio processor 204 to calibrate the audio data sent to or received from audio device 302. HCI 414 may use a control communication port to control the message exchange between the processors for synchronization (e.g., to synchronize audio parameter data between host and radio processors so that portions of the audio parameter data may be stored in both processors). Alternatively, and as shown in FIG. 7, host processor 202, codec 402, or other processing circuitry may be configured to generate an audio signal using the selected audio parameters (e.g., calibrate the audio signal).

Processing circuit 201 may be configured to load the selected set of audio parameters on a per-profile basis, a per-call basis, or other techniques. In a per-call based audio profiling system, when host processor 202 detects a new audio device, host processor 202 will wait for the occurrence of a telephone call (whether incoming or outgoing from device 100) before sending the audio device identifier (or pointer to an associated set of parameters, or the set of parameters or a portion thereof) to radio processor 204. Thus, the set of audio parameters or a portion thereof is loaded at or into radio processor 204 upon the initialization of a call and the audio parameter set is used. In a per-profile based audio profiling system, when host processor 202 detects a new audio device, host processor 202 will then send the audio device identifier (or pointer to an associated set of parameters, or the set of parameters or a portion thereof) to radio processor 204. In a per-profile based audio profiling system, host processor 202 takes one or more of these actions upon a detected device change, so that the set of audio parameters or a portion thereof is loaded at or into radio processor 204 without awaiting the occurrence of a telephone call. The per-profile method may provide for better synchronization (of audio device identifier, pointer, or set of parameters or portion thereof) than a per-call based audio profiling system.

According to one exemplary embodiment, when processing circuit 201 detects the presence of a new audio device (e.g., one not previously used with device 100, one which was previously replaced with another device of a same or similar type, etc.), audio device 302 may provide a device identifier to host audio driver 410, and the device identifier may be provided to run-time audio device tuning circuit 434. If device 100 is engaged in a telephone call, the receipt of the new device identifier may trigger a process wherein the audio parameters are changed during a call in response to the detection of the new audio device 302. In some embodiments, processing circuit 201 is configured to select one of a plurality of audio parameter sets during a telephone call in response to a request from the user to switch from using one audio output (e.g., an audio device, speakerphone, integrated earphone receiver, etc.) to using the audio device.

All or portions of host processor 202 and radio processor 204 may be configured to enter low-power modes, sleep modes, or lower power consumptions modes, for example when not in use. For example, device 100 may be configured to mute/unmute (i.e., turn off/on the voice or other audio functionality) by turning off/on power to at least a portion (e.g., the audio system sub portions) of host processor 202 and radio processor 204. In the per profile based audio profiling system, host processor 202 may be configured to send the audio device identifier (or pointer to an associated set of parameters, or the set of parameters or a portion thereof) to radio processor 204 while at least a portion of radio processor 204 remains in a low-power or sleep state. For example, radio processor 204 may be configured to remain in a mute state when changing its audio profile settings in response to messages from host processor 202 (e.g., a message changing the pointer to the set of audio parameters). This function may be implemented by having the host processor 202 send one or more messages which changes the audio profile setting of radio processor 204 but does not unmute radio processor 204. This function may save power. When a telephone call is initiated (call processing) and a voice traffic channel is opened, unmute may then be turned off.

In addition, a non-volatile audio tuning mechanism for add-on audio devices may be implemented using the processors as described and shown in FIG. 4A. At manufacture, release software within device 100 may be configured to have a portion of non-volatile memory allocated as a placeholder to store potential future sets of audio parameters. In one exemplary embodiment, upon release or acquisition of a new audio device or parameters, suitable audio parameters for the device may be acquired in the lab environment. Once acquired, the set of audio parameters for the new device may be stored in a server computer. The server computer may be configured to push or transmit the set of audio parameters to device 100, either automatically, in accordance with an account setting for an account maintained on the server, in response to a request from an enterprise technician or cellular network sales person, in response to user request, or in response to a request from device 100 after detecting or identifying the new audio device in its vicinity. The new set of audio parameters may, thus, be provided over the air to device 100. Device 100 may then be configured to store the new set of audio parameters in the portion of non-volatile memory allocated during manufacture, or in another memory. The new audio parameters may be applied upon receipt at device 100, may be applied to audio data upon a next power-up of device 100, may be applied in response to user request or confirmation, etc. In this manner, an audio device being previously unknown to device 100 may be known with respect to audio parameters.

Figure 5A:
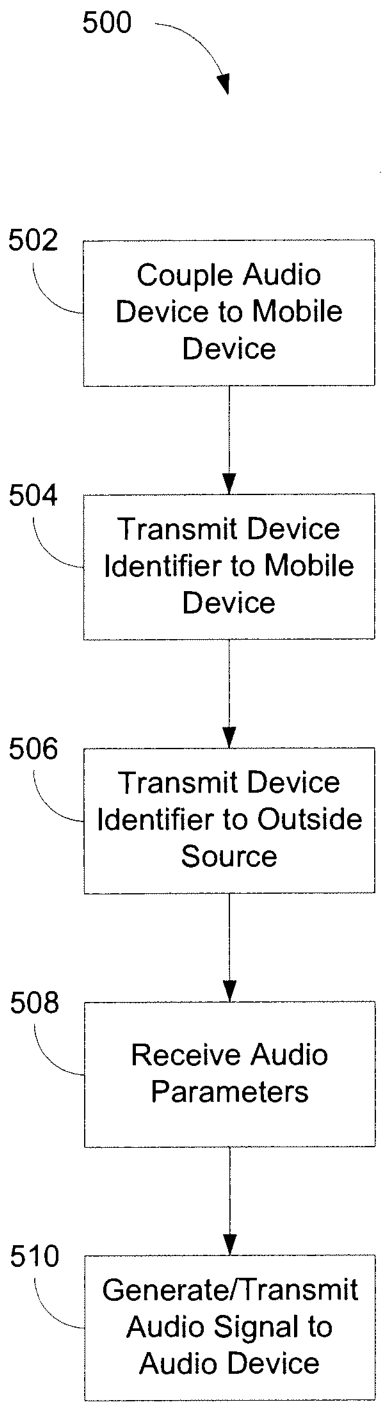
FIG. 5A is a flow diagram of a process of selecting and using an audio parameter for an audio device, according to an exemplary embodiment.

Referring to FIG. 5A, a flow diagram 500 of a process of selecting and implementing an audio parameter is shown, according to an exemplary embodiment. The audio device is coupled to or in communication with the mobile computing device (step 502). Depending on the implementation of the audio device, the audio device may already be coupled to the mobile computing device and step 502 entails the process of enabling the audio device for use. Alternatively, the audio device may be coupled by various ways (e.g., "plugging" the device into a socket provided by the mobile computing device, creating any type of wired or wireless connection, etc.). The mobile computing device may detect the presence of the audio device without requiring user interaction or input with either the mobile computing device or audio device.

Once a connection is made between the audio device and the mobile computing device, a device identifier is transmitted from the audio device to the mobile computing device (step 504) and received by the mobile computing device. The device identifier may be data that identifies the type of audio device that is connecting to the mobile computing device. The audio device may also send other data that may be relevant for the mobile computing device. For example, the device identifier may comprise data identifying a unique manufacturer, model number, class, subclass, and/or other data. Also, other identifiers and data may be sent by the audio device and received by device 100.

The device identifier may be transmitted from the mobile computing device to an outside source (e.g., a remote computer such as a server computer) (step 506). The device identifier may or may not be altered by the mobile computing device. The outside source selects the appropriate audio parameters associated with the device identifier. The device identifier may be sufficient to properly identify the audio device such that a set of audio parameters may be chosen for the specific audio device.

The set of audio parameters is then transmitted to the mobile computing device (step 508). The mobile computing device may include a wireless transceiver circuit configured to receive the audio parameters from the remote computer, either via a wired or wireless (e.g., cellular communications link) connection. The audio parameters may be provided in various formats (e.g., a short message service ("SMS") format, an OTASP (over the air service programming) format, HTTP/FTP Internet format, etc.

Once the audio parameters are received by the mobile computing device, an audio signal may be generated and transmitted to the audio device to provide an improved performance setting for the audio device (step 510). The audio signal may comprise wireless telephony data and/or other relevant data.

Figure 5B:
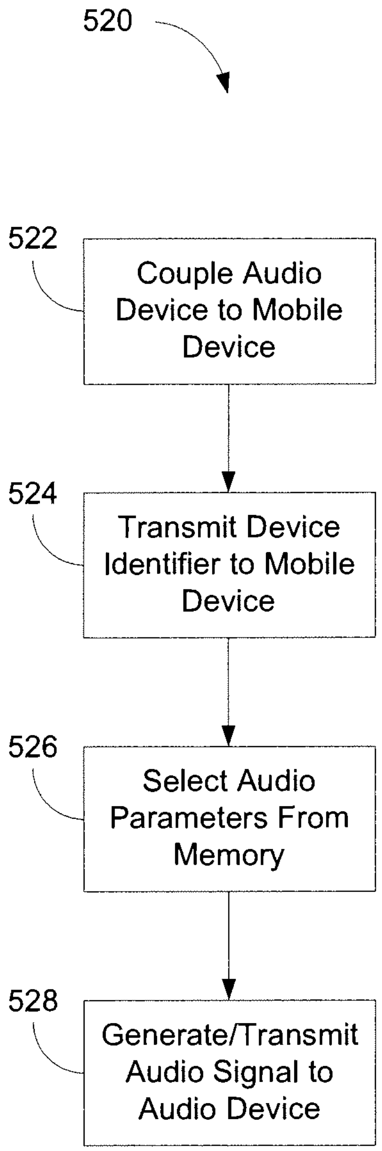
FIG. 5B is a flow diagram of a process of selecting and using an audio parameter for an audio device, according to another exemplary embodiment.

Referring to FIG. 5B, a flow diagram 520 of a process of selecting and implementing an audio parameter is shown, according to an exemplary embodiment. The audio device is first coupled to the mobile computing device (step 522). Depending on the implementation of the audio device, the audio device may already be coupled to the mobile computing device and step 522 entails the process of enabling the audio device for use. Alternatively, the audio device may be coupled by various ways (e.g., "plugging" the device into a socket provided by the mobile computing device, creating any type of wired or wireless connection, pairing of a Bluetooth ID, etc.). The mobile computing device may detect the presence of the audio device without requiring user interaction or input with either the mobile computing device or audio device.

Once a connection is made between the audio device and the mobile computing device, a device identifier is transmitted from the audio device to the mobile computing device (step 524). The device identifier may be data that identifies the type of audio device that is connecting to the mobile computing device. The audio device may also choose to send other data that may be relevant for the mobile computing device.

The device identifier may be used by a processor in the mobile computing device to identify audio parameters that may provide improved performance for the audio device. The processor may access the memory storage of the mobile computing device to select the appropriate audio parameters (step 526). The audio parameters stored in memory may have been saved in memory after a previous external search for the audio parameters or may have been provided as a predetermined setting for a general audio device.

Once the audio parameters are received by the mobile computing device, an audio signal may be generated and transmitted to the audio device such as to provide an improved performance setting for the audio device (step 528). The audio signal may comprise wireless telephony data and/or other relevant data.

The process or any set of the steps described in FIGS. 5A and 5B may be performed "automatically" without a manual input. According to an alternative exemplary embodiment, the user of the mobile computing device may choose to override the process at any time and select his or her own preferred audio parameters for the audio device. The user may select audio parameters currently stored in the memory of the mobile computing device or may search for audio parameters using a wired or wireless connection between the mobile computing device and an outside source.

Figure 5C:
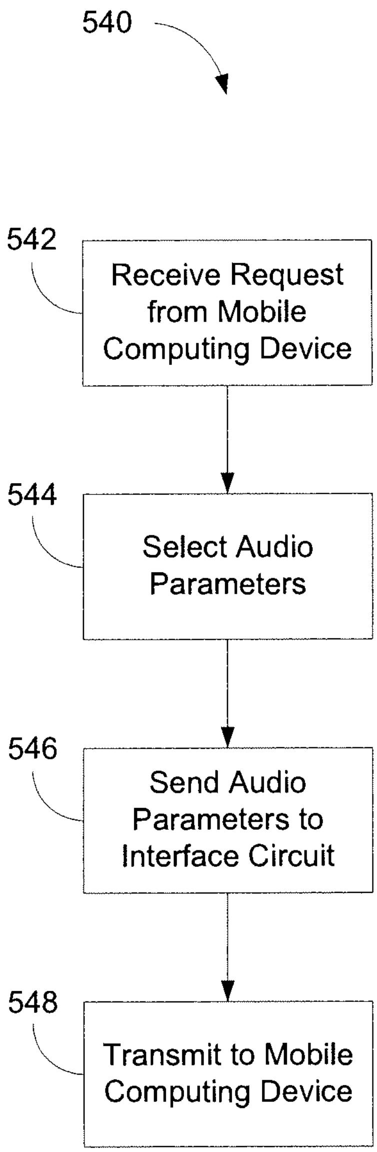
FIG. 5C is a flow diagram of a process of a server computer receiving and responding to a request, according to an exemplary embodiment.

Referring to FIG. 5C, a flow diagram 540 of a process of a server computer receiving and responding to a request is shown, according to an exemplary embodiment. Flow diagram may represent steps performed between steps 506 and 508 of FIG. 5A. At step 542, the server computer is configured to receive an input signal from the mobile computing device. The input signal may come in the form of a device identifier.

Audio parameters may be selected when the device identifier is provided (step 544). The audio parameters may be selected from memory within the server computer. The memory may be configured to hold audio parameter sets for various audio devices. Alternatively, any number of databases or other sources of information may be used to help in the process of determining the ideal audio parameter set based on the device identifier provided. The various sources may be internal or external (connecting to the server computer via a wired or wireless connection).

Once the audio parameters are selected, the processor of the server computer provides them to an interface circuit (step 546). The interface circuit configures the audio parameters for transmission to the mobile computing device (step 548).

As an example, a user of the mobile computing device may choose to switch from using one audio output to using a new audio device during the middle of a telephone call. The user may select one of a plurality of audio parameter sets during the call. The user may use audio devices as described in FIG. 1 to audibly make the decision or the user may use the various user input devices as described in FIG. 1 to make the decision.

A data structure for tunable audio parameters may be provided. According to one exemplary embodiment, the data structure may provide the structure for storing audio parameters for a given audio device which may be used to form an audio parameter set for the audio device. The data structure comprises calibration values for a PCM path which may or may not change based on the volume level, according to various embodiments. Other components of the data structure may comprise one or more of: an echo cancellation parameter, a noise suppressor variable, transmitter voice volume or gain, transmitter dual-tone multi-frequency (DTMF) gain, CODEC transmit gain, CODEC receive gain, CODEC ST (side tone) gain, transmit PCM filter coefficients, receive PCM filter coefficients, receive offset in dBm, automatic gain control/automotive voltage control (AGC/AVC) parameters, other various gain parameters, other filter information (e.g., transmission filter, bandpass filter, etc.), or other parameters, etc.

For example, the echo cancellation parameter may take on values relating to the mode of the audio device. In general, various echo cancellation parameters may include the echo mode, echo round-trip delay, and echo suppression, etc. Modes may include a handset mode which introduces a mild echo and a relatively short delay (less than a 16-millisecond dispersion), a headset mode which introduces a moderate echo and short delay, a "car kit" mode which introduces a loud echo and long delay (up to 64-millisecond dispersion), or speakerphone mode to handle louder echoes and extreme acoustic distortion.

Other examples of parameters may include filter parameters such as Tx PCM filter parameters and Rx PCM filter parameters, AGC parameters such as on/off control and AGC data, and AVC on/off control. Gain setting parameters may include Tx or Rx volume gain, Tx or Rx DTMF tone gain, Tx or Rx codec gain, and side tone on/off control. PCM format parameters may also be included (e.g., 8-bit, 16-bit linear, u-law, etc.).

According to one advantageous embodiment, a dual-processor PCM audio control architecture is provided for a telephony voice call.

According to another advantageous embodiment, processing circuit 201 may be configured to use a per-profile method of audio profiling which can save power. In this embodiment, processing circuit 201 is configured to update a selected set of audio parameters without waking up the PCM audio task/bus on the radio processor by using, for example, the HCI interface to send a new set of audio parameters to the radio processor. Once a voice call is initiated after this updating step, the radio processor may be configured to use the new set of audio parameters to calibrate or adjust the audio data being transmitted or received on the PCM audio bus 432.

According to another advantageous embodiment, device 100 is configured to store in memory different sets of audio parameters for a large number of known audio devices, including devices of the same type.

According to another advantageous embodiment, new audio devices may be accommodated for use with device 100 by allowing updates to audio parameter data.

According to another advantageous embodiment, the host processor detects the presence of an audio device, receives device data indicating an audio device class/subclass, and transmits the device data and/or a set of audio parameters selected based on the device data. The modem processor receives the data from the host, selects a proper vocoder, selects, applies, or requests from a server a suitable set of audio parameters, and applies the audio parameters to audio data relating to a telephony call or other device function. The radio processor 204 may also be configured to automatically (i.e., without user input) identify an audio profile for the new device, set a new audio path and allocate the data in nonvolatile memory to tune audio at run time. Alternatively, a single processor could perform all of these steps.

According to another advantageous embodiment, a device 100 as described in any of the embodiments herein may be packaged, sold, manufactured, or supplied along with an audio device as described herein.

What is claimed is:

1. A mobile computing device, comprising:

a first processor to communicate with an audio device;

a second processor to communicate audio data over a wireless communication link;

a memory to store a plurality of sets of audio parameters for a device type, each set of audio parameters associated with a different device identifier, wherein the first processor to establish an audio path between the second processor and the audio device based on a selected one of the plurality of sets of audio parameters; and a mapping table comprising pointer addresses which associate the plurality of sets of audio parameters with audio devices, wherein each of the sets of audio parameters is associated with a specific audio device and identified by a pointer address in the mapping table corresponding to the specific audio device, wherein the mapping table is to provide a common numbering system between the first processor and the second processor, and the first processor to identify the pointer address and audio parameters from the mapping table for the audio device and to send the audio parameters to the second processor as the selected set of audio parameters.

2. The mobile computing device of claim 1, wherein the audio path comprises a physical voice audio path.

3. The mobile computing device of claim 1, wherein the audio path comprises a virtual voice audio path.

4. The mobile computing device of claim 1, wherein the first processor is a host processor and the second processor is a radio processor, the host processor and radio processor comprise a multi-core processor.

5. The mobile computing device of claim 1, wherein the first processor is a host processor and the second processor is a radio processor.

6. The mobile computing device of claim 1, wherein the plurality of sets of audio parameters are categorized in memory by device class and device sub-class.

7. A mobile computing device to communicate with an audio device, comprising:

an interface circuit;

a memory to store a plurality of sets of audio parameters for a device type, each set of audio parameters associated with a different device identifier;

and a processing circuit including a first processor to communicate with an audio device and a second processor to communicate audio data over a wireless communication link, the processing circuit to:

receive a device identifier from the audio device, select one of the plurality of audio parameter sets based on the device identifier, generate an audio signal using the selected audio parameters, and transmit the audio signal to the audio device using the interface circuit;

and a mapping table comprising pointer addresses which associate the plurality of sets of audio parameters with audio devices, wherein each of the sets of audio parameters is associated with a specific audio device and identified by a pointer address in the mapping table corresponding to the specific audio device and wherein the mapping table is to provide a common numbering system between at least the two processors in the processing circuit, wherein the first processor identifies the pointer address and audio parameters from the mapping table for the audio device and sends the audio parameters to the second processor as the selected set of audio parameters.

8. The mobile computing device of claim 7, wherein each of the plurality of sets of audio parameters comprise an echo cancellation parameter and a gain parameter.

9. The mobile computing device of claim 7, wherein the plurality of sets of audio parameters are for a plurality of different Bluetooth-compatible headsets.

10. The mobile computing device of claim 7, wherein the processing circuit comprises a host processor and a radio processor to communicate with one another via a communication interface.

11. The mobile computing device of claim 7, wherein the processing circuit to receive the device identifier and select the audio parameter set based on the device identifier without manual input from a user of the mobile computing device.

12. The mobile computing device of claim 11, wherein the processing circuit to detect a signal from the audio device without manual input from a user of the mobile computing device.

13. The mobile computing device of claim 7, further comprising the audio device.

14. The mobile computing device of claim 7, further comprising a housing to be held in a hand while in use, wherein the processing circuit to operate a wireless telephony application and to wirelessly synchronize personal information stored in the memory with a remote computer.

15. The mobile computing device of claim 7, the interface circuit to communicate with the audio device via a wired connection.

16. The mobile computing device of claim 7, wherein the audio signal comprises wireless telephony data.

17. The mobile computing device of claim 16, wherein the processing circuit to select the one of the plurality of audio parameter sets during a telephone call in response to a request from the user to switch from using one audio output to using the audio device.

18. A mobile computing device to communicate with an audio device, comprising:

an interface circuit to communicate with the audio device;

a memory to store a plurality of sets of audio parameters for a device type, each set of audio parameters associated with a different device identifier;

a mapping table comprising pointer addresses which associate the plurality of sets of audio parameters with audio devices, wherein each of the sets of audio parameters is associated with a specific audio device and identified by a pointer address in the mapping table corresponding to the specific audio device;

and a processing circuit including a first processor to communicate with an audio device and a second processor to communicate audio data over a wireless communication link, the processing circuit to receive a set of audio parameters from a remote computer, to store the audio parameters in the memory, to generate an audio signal using the stored audio parameters, and to transmit the audio signal to the audio device through the interface circuit, wherein the mapping table is to provide a common numbering system between at least the two processors in the processing circuit, wherein the first processor identifies the pointer address and audio parameters from the mapping table for the audio device and sends the audio parameters to the second processor as the selected set of audio parameters.

19. The mobile computing device of claim 18, further comprising a wireless transceiver circuit to receive the set of audio parameters from the remote computer wirelessly.

20. The mobile computing device of claim 19, wherein the wireless transceiver circuit to receive the set of audio parameters from the remote computer over a cellular communication link.

21. The mobile computing device of claim 19, wherein the wireless transceiver circuit to receive the set of audio parameters from the remote computer in a short message service (SMS) format, OTASP format, or HTTP/FTP format.

22. The mobile computing device of claim 18, wherein the device type is Bluetooth-compatible headsets.

23. The mobile computing device of claim 18, wherein the device type is universal serial bus headsets.

24. The mobile computing device of claim 18, wherein the processing circuit to perform the following steps without requiring input from a user:

detect presence of the audio device, receive a device identifier from the audio device, and select from memory a set of audio parameters associated with the device identifier.

25. The mobile computing device of claim 18, wherein at least one set of audio parameters for the device type is loaded into the memory by a manufacturer and at least one other set of audio parameters for the device type is received wirelessly from the remote computer.

26. The mobile computing device of claim 18, wherein the processing circuit to delete a set of audio parameters from the memory.

27. A server computer, comprising:

an interface circuit to receive a request from a mobile computing device for a set of audio parameters, wherein the request comprises a device identifier;

a memory to store a plurality of sets of audio parameters for each of a plurality of audio device types usable with the mobile computing device;

a mapping table comprising pointer addresses which associate the plurality of sets of audio parameters with audio devices, wherein each of the sets of audio parameters is associated with a specific audio device and identified by a pointer address in the mapping table corresponding to the specific audio device; and a processing circuit to receive the request, select one of the plurality of sets of audio parameters based on the device identifier, and send the selected set of audio parameters to the interface circuit for transmission to the mobile computing device, wherein the mapping table is to provide a common numbering system between at least two processors in the mobile computing device, wherein the at least two processors in the mobile computing device include a first processor to communicate with an audio device and a second processor to communicate audio data over a wireless communication link, the processing circuit, and wherein the mapping table is adapted for the first processor of the mobile device to identify the pointer address and audio parameters from the mapping table for the audio device and to send the audio parameters to the second processor of the mobile device as the selected set of audio parameters.

28. The server computer of claim 27, wherein the interface circuit is configured to communicate with a cellular network for communication with the mobile computing device.

29. The server computer of claim 27, wherein at least one of the device types is Bluetooth headsets and at least one other of the device types is universal serial bus headsets.

30. A mobile computing device, comprising:

a mapping table comprising pointer addresses associating a plurality of sets of audio parameters with a plurality of device types, wherein each of the sets of audio parameters is associated with a specific audio device and identified by a pointer address in the mapping table corresponding to the specific audio device;

a first processor configured to communicate with an audio device and to generate a pointer address from the mapping table based on an audio device identifier associated with the audio device; and a second processor configured to communicate audio data over a wireless communication link, to receive the pointer address from the first processor, and to select audio parameters from a memory based on the pointer address, wherein the memory is configured to store the plurality of sets of audio parameters for each of the plurality of device types, the second processor to generate the audio data using the selected audio parameters, and the first and second processors having a common audio device numbering system based on the pointer address, wherein the mapping table is to provide a common numbering system between the first processor and the second processor.

31. The mobile computing device of claim 30, wherein the first processor comprises a first memory to store gain parameters and the second processor comprises a second memory to store gain parameters and echo cancellation parameters, wherein the selected audio parameters comprise the gain parameters and echo cancellation parameters stored in the second processor.

32. The mobile computing device of claim 30, wherein the second processor to receive the audio parameters from the first processor or from a remote server.

33. The mobile computing device of claim 30, wherein the pointer address comprises a first portion representing a type of device and a second portion representing a particular device within the type.

34. The mobile computing device of claim 30, wherein when at least a portion of the second processor is in a low power mode, receipt of the pointer address occurs without removing the second processor from a low power mode.

35. The mobile computing device of claim 34, wherein the low power mode is a mute mode.

* * * * *